United States Patent [19]

Lepper

[11] Patent Number: 4,488,602
[45] Date of Patent: Dec. 18, 1984

[54] PROCESS FOR EMULSION FLOODING OF PETROLEUM RESERVOIRS

[75] Inventor: Uwe Lepper, Lachendorf, Fed. Rep. of Germany

[73] Assignee: Mobil Oil Corporation, New York, N.Y.

[21] Appl. No.: 495,204

[22] Filed: May 16, 1983

[30] Foreign Application Priority Data

May 14, 1982 [DE] Fed. Rep. of Germany ....... 3218346

[51] Int. Cl.³ .............................................. E21B 43/22
[52] U.S. Cl. ................................ 166/274; 252/8.55 D
[58] Field of Search ............... 166/270, 273, 274, 275; 252/8.55 D

[56] References Cited

U.S. PATENT DOCUMENTS

| | | | |
|---|---|---|---|
| 3,126,952 | 3/1964 | Jones | 166/274 |
| 3,307,628 | 3/1967 | Sena | 166/274 |
| 3,455,386 | 7/1969 | Reisberg | 166/275 |
| 3,520,366 | 7/1970 | Jones | 166/273 |
| 3,670,819 | 6/1972 | Dauben et al. | 166/273 X |
| 4,269,271 | 5/1981 | Shupe et al. | 166/274 |
| 4,337,159 | 6/1982 | Reed et al. | 166/273 X |

*Primary Examiner*—George A. Suchfield
*Attorney, Agent, or Firm*—Alexander J. McKillop; Michael G. Gilman; Edward J. Trojnar

[57] ABSTRACT

A process for emulsion flooding of petroleum reservoirs comprising injecting a thermodynamically stable microemulsion consisting of oil, a non-ionic surfactant and water which optionally contains salts dissolved in any desired concentrations, into an injection well; driving injected microemulsion bank through the reservoir by means of water which likewise may contain salts dissolved in any desired concentrations. The microemulsion bank in contact with the water driving the bank forms an excess phase with a high water content, a low surfactant content and low oil content, and has such a viscosity sufficient to prevent the penetration of the subsequent water into the microemulsion bank which would cause a decrease of its flowability and its ability to displace oil.

13 Claims, 2 Drawing Figures

PROCESS FOR EMULSION FLOODING OF PETROLEUM RESERVOIRS

The contents of my earlier filed application, filed in West Germany as Ser. No. P3218346.1 on May 14, 1982, is incorporated herein by reference in its entirety.

BACKGROUND OF THE INVENTION

In order to satisfy the demand for petroleum and its products, tertiary recovery processes have been developed in which quantities of petroleum remaining in reservoirs after water flooding may be recovered by the use of chemical flooding. For instance, it is known to drive microemulsions through a reservoir with subsequently introduced high viscosity polymeric solutions. In this case, the term "microemulsion" defines a thermodynamically stable emulsion containing oil, water and a surfactant. Such processes are described in U.S. Pat. Nos. 3,506,070 and 3,506,071 which are incorporated herein by reference. It is also known to formulate the microemulsion within the reservoir through injection of an aqueous surfactant solution which then combines with the petroleum and water found within the reservoir.

However, these known processes suffer a number of deficiencies. The first mentioned process has the disadvantage that the surfactant used is ionic and generally in admixture with further co-surfactants. In long-lasting underground petroleum recovery, an alteration of the uniformity of the distribution of the surfactants within the microemulsion occurs resulting in a non-homogeneous emulsion which does not function efficiently. Further, the efficiency of this microemulsion also substantially depends on the salt concentration of the water component prevailing in the reservoir.

The second process has the disadvantage that the microemulsion is formed within the reservoir only after the injection of the aqueous solution of surfactants. Here too, ionic surfactants are usually used in combination with one or more cosurfactants. Therefore, the resulting variations in the composition and the efficiency of the resultant microemulsion are not unexpected. In particular, variations in the salt content of the water component of the reservoir have a considerable influence with respect to the variations in the efficiency of the emulsion.

These recovery methods also suffer from the disadvantage that the microemulsion which is injected into or formed within the reservoir has to be driven through the reservoir by means of a polymer solution. It has been found that extraordinarily large amounts of polymer solution are necessary for this purpose thereby greatly increasing the cost of the process. Finally, it must also be noted that the salinity of the reservoir fluids must fall within a required range. If this salinity is not present within the reservoir, it may be necessary to correct it through injection of water having the desired salt concentration.

Recently, there was proposed a process according to which a chemical flooding process can be carried out even if the salt concentration of the reservoir is above the optimal concentration. This process necessitates a graduated salt concentration to be introduced into the reservoir by means of the surfactant and polymer solutions and requires that the reservoir minerals be relatively insensitive to low salt contents.

The problem to be solved therefore is to provide an improved process for the emulsion flooding of petroleum reservoirs at an optimum efficiency independent from the salt concentration or its variations within the water phase of the reservoir, without the necessity of using a mixture of surfactants of different chemical composition which might result in an inhomogeneity during production and without the necessity of driving the microemulsion through the reservoir with the aid of a polymer solution.

BRIEF SUMMARY OF THE INVENTION

According to the present invention the problems of the prior art in the use of surfactant mixtures and polymeric solution during fluids are solved by providing a process for emulsion flooding of petroleum reservoirs, injecting a thermodynamically stable microemulsion consisting of oil, a non-ionic surfactant and water which optionally contains salts dissolved in any desired concentrations into an injection well; and driving the injected microemulsion bank through the reservoir with water which may also contain dissolved salts in any desired concentration. The microemulsion bank/water bank interface forms an excess phase with a high water content, a low surfactant content and low oil content, and has such a viscosity sufficient to prevent the penetration of the water into the microemulsion bank which would cause a decrease of its flowability and its ability to displace oil.

DETAILED DESCRIPTION OF THE INVENTION

Figure 1:
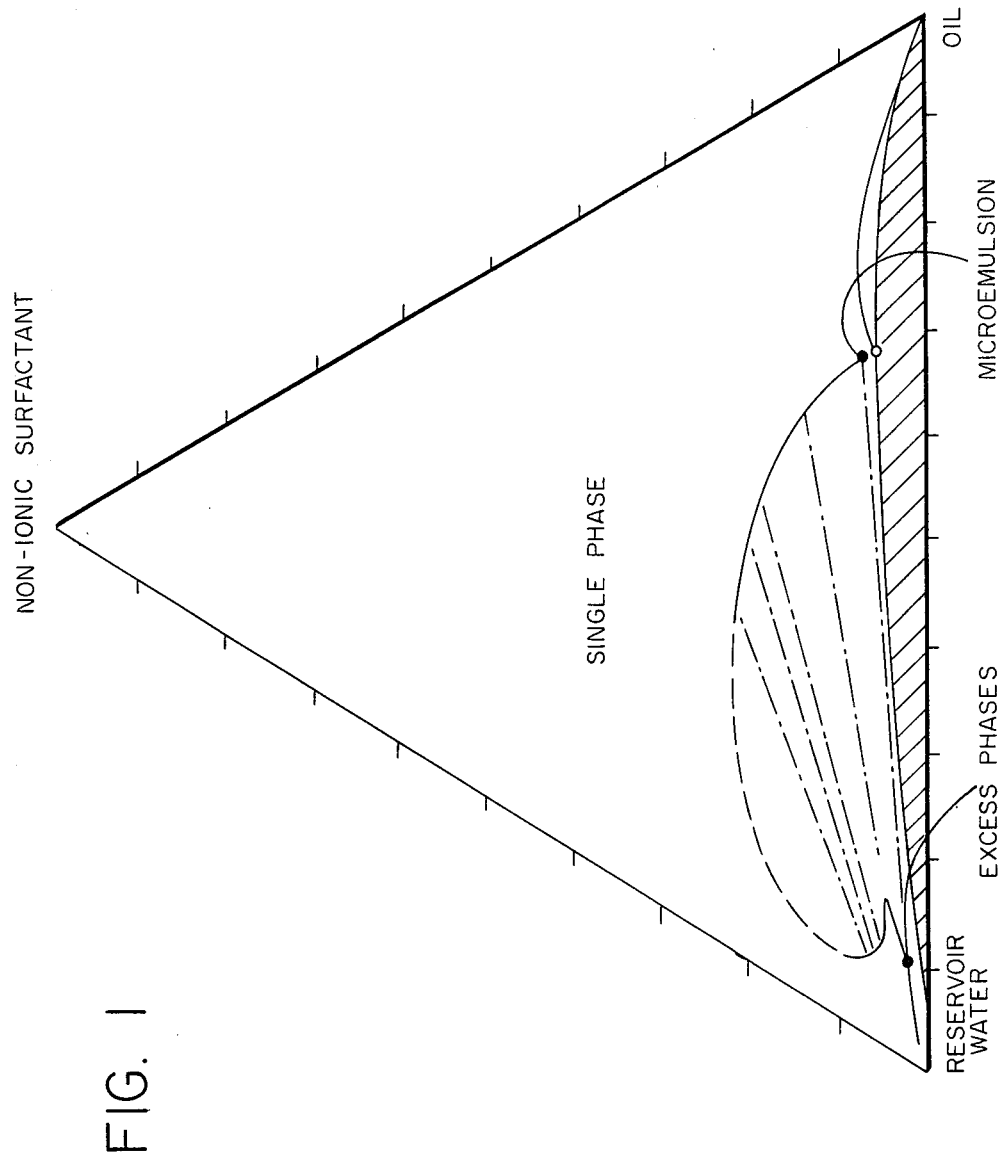
FIG. 1 is a phase diagram of the three components of the microemulsion, namely non-ionic surfactant, reservoir water and oil.

This invention relates to a process for emulsion flooding of petroleum reservoirs. More particularly, it relates to a process for the recovery of petroleum from a reservoir having at least one injection well in fluid communication with at least one production well comprising:

(a) introducing into the reservoir through the injection well a thermodynamically stable microemulsion comprising oil, water and a non-ionic surfactant;

(b) injecting an aqueous driving fluid through the injection well, to drive the microemulsion and petroleum towards the recovery well, the aqueous driving fluid contacting the emulsion thereby forming an excess phase having a high water content, low oil content, a low surfactant content and a viscosity sufficient to prevent penetration of the aqueous driving fluid into the microemulsion; and (c) recovering displaced petroleum from said recovery well.

The term "excess phase" defines a phase which is formed at the interface between the injected microemulsion and the subsequently introduced water phase and which contains a high concentration of water and a low concentration of surfactant and oil.

The surfactants employed in the present invention are non-ionic polyalkylene glycols which may optionally be substituted. According to a preferred embodiment there can be used a surfactant of the following general formula:

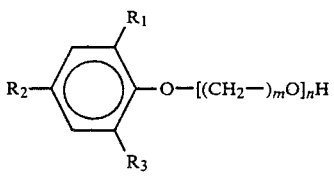

wherein $R_1$, $R_2$ and $R_3$ are the same or different radicals selected from the group of hydrogen and alkyl radicals, comprising 1 to 14 carbon atoms, especially 4 to 10 carbon atoms, m is a numeral of from 2 to 4, preferably 2, and n is a numeral of from 6 to 22.

Examples for suitable surfactants which can be used in the process according to the invention are polyethylene glycols, polypropylene glycols and polybutylene glycols which can carry additional substituents, which additional substituents may have a phenolic character, and may comprise also long-chain hydrocarbon radicals. The use of polyethylene glycols is especially preferred.

The viscosity of the microemulsion and the excess phase desired for carrying out the process of the present invention is controlled by selection of a specific surfactant in accordance with the physical behavior of the oil to be exploited. The viscosity may be controlled for instance by means of the number of the recurring ether units or the presence of a phenolic substituent in the surfactant. The viscosity of the microemulsion may be up to ten times the viscosity of the oil to be exploited. The viscosity of the excess phase is generally at least two or more times the viscosity of the microemulsion. The microemulsions of this invention are characterized as having water or aqueous solution as the external phase, as essentially Newtonian fluids and as being thermodynamically stable.

The oil component of the microemulsion to be injected may consist either of recovered crude oil or of any suitable refined oil component or mixtures thereof.

The concentration of the surfactant in the microemulsion can vary within relatively broad ranges. Suitable concentration ranges are from 5 to 20 percent by volume, preferably from 5 to 10 percent by volume, based on the total volume of the microemulsion.

The suitable viscosities of the microemulsion and the excess phase formed are determined in relationship to the particular conditions of a reservoir. The desired viscosities can be determined by means of laboratory tests which preferably are carried out with two-phase systems in usual manner.

From FIG. 1, it is evident that the three-component system is present in one-phase above the curved boundary line. Furthermore, it can be noted that the phase diagram shows mixture interstices. The conodes recorded in one of the mixture interstices concurrently show thermodynamically stable phases of the microemulsion on the one side and of the excess phase on the other side. From this representation it can be seen that the excess phase, which is indicated in the drawing in the left lower corner, is formed when a microemulsion having a certain composition, such as indicated in the drawing on the right side, is injected and subsequently the microemulsion is contacted with the water phase. In the example represented in the drawing the driving excess phase comprises about 88% water, about 2% surfactant and about 10% oil.

It has been found that the excess phase has a suitable viscosity to reliably prevent the water phase which drives the injected microemulsion through the reservoirs from penetrating into the microemulsion. In case such a penetration of the water phase into the microemulsion would occur, the homogeneity of the microemulsion would be destroyed rendering the microemulsion incapable of driving out the trapped oil. Moreover, the movement of the microemulsion through the reservoir would be endangered. Driving the microemulsion reliably through the reservoir without the occurrence of disturbances by penetrating water can be accomplished during recovery as long as the microemulsion is in equilibrium with the excess phase. The advantage achieved according to the present invention resides in the fact that it is no longer necessary to use a polymer solution for driving the microemulsion through the reservoir.

Furthermore it can be taken from FIG. 1 that it is possible to use a single surfactant, without the co-use of co-surfactants, in the presence of high salt concentration reservoir fluids.

A further advantage of the process according to the present invention resides in the fact that there can be obtained optimal viscosities of the microemulsion and the excess phase as well as the presence of a three-phase area, as represented in FIG. 1 by the hatched lower area. The phases present in this hatched area are formed at the front surface of the injected microemulsion which comes into contact with water and oil contained in the reservoir. In this hatched area so-called middle-phase microemulsions are in equilibrium with the excess phases of oil and water. According to their nature, they possess low interfacial tensions towards the excess phase. They are capable of displacing not only the oil from the reservoirs but also the water. These middle-phase microemulsions are automatically formed at the front surface of the injected microemulsion being in contact with water and oil, and thus protect the main part of the microemulsion from the contact with oil and water of the reservoir. The advantage achieved thereby is that the process of the present invention can be carried out independent of the variations of the salt concentration of the reservoir water, which, it is known, may occur during the recovery of petroleum from a reservoir.

Figure 2:
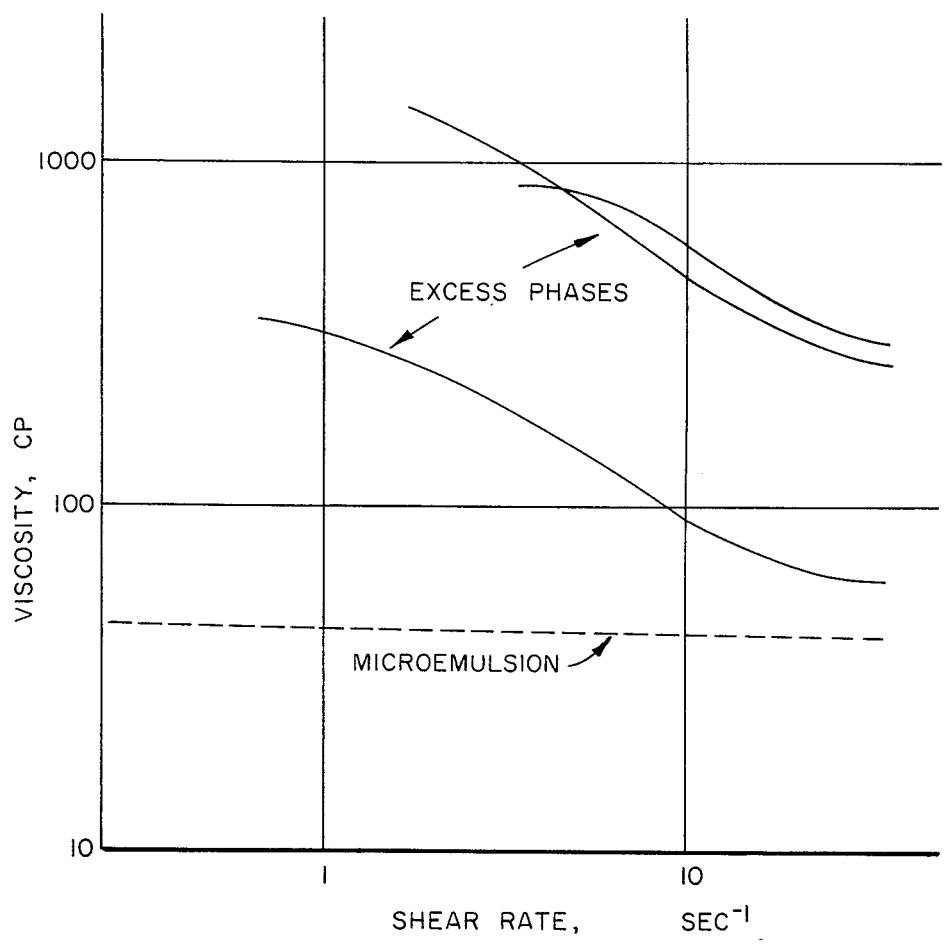
FIG. 2 is a representation of examples for the viscosities of phases in equilibrium in relationship to the shear rate.

FIG. 2 shows a further example demonstrating the viscosity behavior of the phases in equilibrium in the two-phase area of concern. It can be seen from the viscosity that the microemulsion is a Newtonian fluid as its viscosity does not depend on the shear rate, whereas the excess phases have viscosities which vary inversely to the shear rate. This viscosity behavior of the excess phase is similar to the viscosity behavior of the polymer solutions which had to be applied in hitherto known processes using ionic surfactants and co-surfactants. Therefore, it appears that the excess phases may adequately assume the functions previously performed by the polymer solutions.

Apart from the advantage that the use of an additional polymer solution is no longer necessary, the instant invention also possesses the advantage that the excess phase is formed exactly at the place at which it is needed, so that any undesired dispersion of the driving media with respect to the microemulsions is reliably prevented.

A further advantage of the invention resides in the fact that only a relatively small amount of the microemulsion is necessary. Suitable amounts are within the range of 5 to 30%, preferably 5 to 15%, based on the total pore volume of the reservoir minerals.

The invention is explained in detail by means of the following Example.

EXAMPLE

A microemulsion of 7% by volume dinonylphenoloxethylate with an average of 11 recurring ethylene oxide units as a non-ionic surfactant (53% by volume of a mixture of a refined oil and the reservoir oil to 40% by volume brine, having the composition indicated below) possessing a viscosity of 29.4 cp was produced.

The brine had the following composition:

|  | g/l |
|---|---|
| NaCl | 112.3 |
| KCl | 4.2 |
| CaCl$_2$ | 11.1 |
| MgCl$_2$ | 5.5 |

This microemulsion was injected in a linear laboratory model of a reservoir which had been subjected to water flooding. The microemulsion formed an excess phase with the following composition:
- 0.4% by volume dinonylphenoloxethylate (11 moles ethylene oxide units)
- 3.3% by volume of the aforementioned oil mixture, and
- 96.3% by volume of the brine used in the microemulsion.

This excess phase had a viscosity of 78 cp under these test conditions.

There was obtained an oil displacement of 100% of the remaining oil when injecting the microemulsion in an amount of 15% of the pore volumes being present in the linear laboratory model of the reservoir.

What is claimed is:

1. Process for the recovery of petroleum from a reservoir having at least one injection well and at least one recovery well comprising:
   (a) introducing into said reservoir through said injection well a thermodynamically stable microemulsion consisting essentially of oil, water and a non-ionic surfactant;
   (b) injecting an aqueous driving fluid into said reservoir through said injection well, to drive said microemulsion and petroleum towards the recovery well, said aqueous driving fluid contacting said emulsion to form an excess phase having a high water content, low oil content, a low surfactant content and a viscosity sufficient to prevent penetration of said driving fluid into the microemulsion; and
   (c) recovering displaced petroleum from said recovery well.

2. The process of claim 1 wherein the non-ionic surfactant is a polyalkylene glycol.

3. The process of claim 2 wherein the polyalkylene glycol is substituted.

4. The process of claim 1 wherein the non-ionic surfactant is

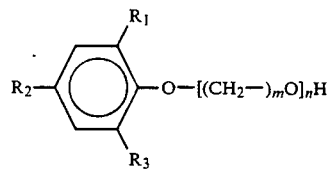

wherein R$_1$, R$_2$ and R$_3$ are the same or different radicals selected from the group of hydrogen and alkyl radicals having from 1 to 14 carbon atoms, m is a numeral from 2 to 4 and n is a numeral of from 6 to 22.

5. The process of claim 4 wherein m is 2.

6. The process of claim 1 wherein the oil component of the microemulsion is selected from the group consisting of crude oil, refined oil and mixtures thereof.

7. The process of claim 1 wherein the concentration of the surfactant in the microemulsion is from 5 to 20% by volume, based on the total volume of the microemulsion.

8. The process of claim 7 wherein the concentration of the surfactant in the microemulsion is from 5 to 10% by volume, based on the total volume of the microemulsion.

9. The process of claim 1 wherein the viscosity of the injected microemulsion is up to ten times the viscosity of the oil to be recovered.

10. The process of claim 1 in which said driving fluid is substantially free of polymeric thickeners.

11. The process of claim 1 in which said driving fluid has a viscosity which is lower than the viscosity of said microemulsion.

12. The process of claim 1 in which said excess phase is a non-Newtonian fluid.

13. The process of claim 1 in which said excess phase has a viscosity which is at least two times the viscosity of said microemulsion.

* * * * *